(12) United States Patent
Chick et al.

(10) Patent No.: US 11,269,267 B2
(45) Date of Patent: Mar. 8, 2022

(54) CONTACT PADS ON AN OUTPUT ASSEMBLY OF A PRINT PARTICLE REPLENISHMENT DEVICE INCLUDING AN INTERIOR DISK AND A COVER DISK

(71) Applicant: HEWLETT-PACKARD DEVELOPMENT COMPANY, L.P., Spring, TX (US)

(72) Inventors: Andy Philip Chick, Vancouver, WA (US); Ji-Won Moon, Pangyo (KR); Min-Chul Lee, Pangyo (KR); Kwangsung Park, Pangyo (KR); Yuntae Kim, Pangyo (KR); Jinwoo Noh, Pangyo (KR); Pratik Pravinkumar Shah, San Diego, CA (US); Matthew James Storey, Austin, TX (US); Zackary Thomas Hickman, Austin, TX (US); Amy Moon Williams, Austin, TX (US); An Tran, Austin, TX (US); Bennett Alexander Nadeau, Austin, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/252,867

(22) PCT Filed: Aug. 30, 2018

(86) PCT No.: PCT/US2018/048843
§ 371 (c)(1),
(2) Date: Dec. 16, 2020

(87) PCT Pub. No.: WO2020/046338
PCT Pub. Date: Mar. 5, 2020

(65) Prior Publication Data
US 2021/0116837 A1    Apr. 22, 2021

(51) Int. Cl.
*G03G 15/08*    (2006.01)
*B33Y 10/00*    (2015.01)
(Continued)

(52) U.S. Cl.
CPC ....... *G03G 15/0863* (2013.01); *B29C 64/321* (2017.08); *B33Y 10/00* (2014.12); *B33Y 30/00* (2014.12)

(58) Field of Classification Search
USPC ........................................... 399/262
See application file for complete search history.

(56) References Cited

U.S. PATENT DOCUMENTS

| 5,075,724 A | 12/1991 | Wada et al. |
| 5,184,181 A | 2/1993 | Kurando et al. |

(Continued)

FOREIGN PATENT DOCUMENTS

| CN | 104317175 A | 1/2015 |
| EP | 2261751 A2 | 12/2010 |

*Primary Examiner* — Quana Grainger
(74) *Attorney, Agent, or Firm* — Staas & Halsey LLP (57) ABSTRACT

Examples of a print particle replenishment device for replenishing a host device are described herein. In some examples, the print particle replenishment device includes an output assembly to output print particles, comprising an interfacing portion. In some examples, the print particle replenishment device includes a plurality of contact pads disposed on an outer portion of the output assembly to rotate with the output assembly when opening a channel of the print particle replenishment device.

25 Claims, 7 Drawing Sheets

(51) Int. Cl.
*B33Y 30/00* (2015.01)
*B29C 64/321* (2017.01)

(56) References Cited

U.S. PATENT DOCUMENTS

| | | |
|---|---|---|
| 6,266,506 B1 | 7/2001 | Kurz et al. |
| 6,650,847 B2 | 11/2003 | Guy et al. |
| 8,948,616 B2 | 2/2015 | Tanaka |
| 2010/0316414 A1* | 12/2010 | Saito .................. G03G 15/0868 399/258 |
| 2011/0217067 A1* | 9/2011 | Tokuno .............. G03G 15/0872 399/110 |
| 2015/0301476 A1* | 10/2015 | Leemhuis .......... G03G 15/0863 399/83 |
| 2021/0096503 A1* | 4/2021 | Moon ................ G03G 15/0872 |

* cited by examiner

CONTACT PADS ON AN OUTPUT ASSEMBLY OF A PRINT PARTICLE REPLENISHMENT DEVICE INCLUDING AN INTERIOR DISK AND A COVER DISK

CROSS REFERENCE TO RELATED APPLICATIONS

This application is a U.S. National Stage Application which claims the benefit under 35 U.S.C. § 371 of International Patent Application No. PCT/US2018/048843 filed on Aug. 30, 2018, the contents of which are incorporated herein by reference.

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round. Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

Ensuring transfer of authentic print particles may also be beneficial. For example, preventing the use of print particles that perform worse or that are incompatible with a printer may be beneficial.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

Figure 1:
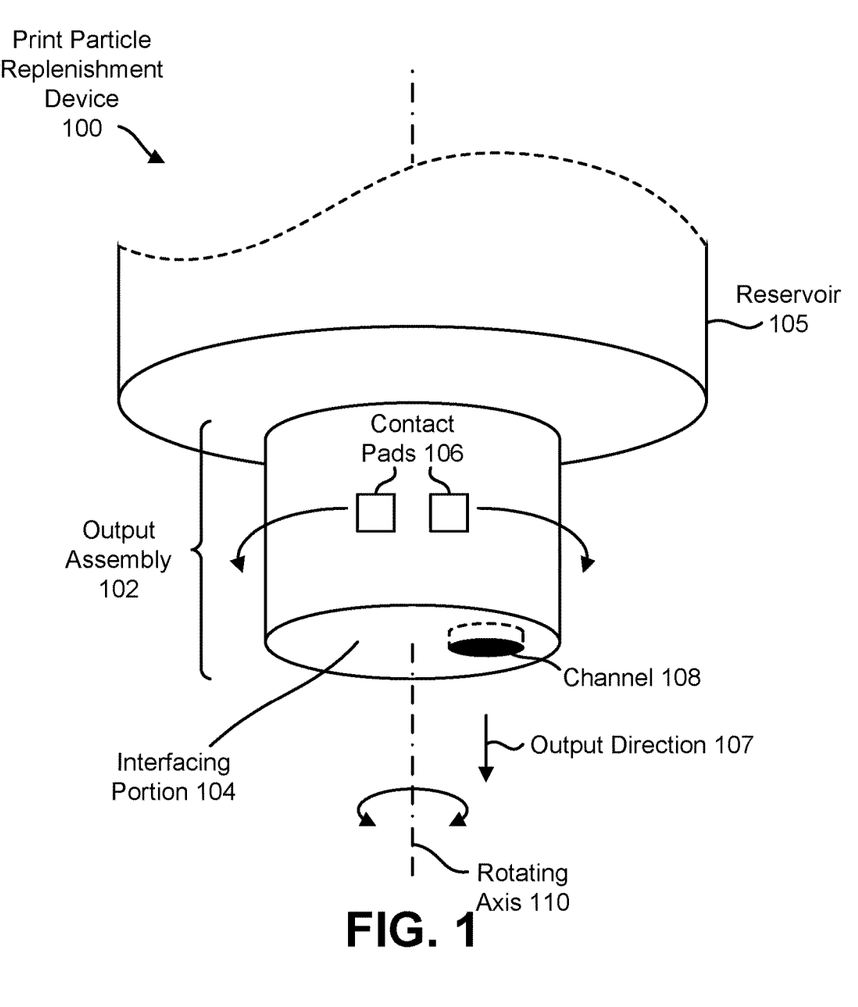
FIG. 1 is an example of a print particle replenishment device.

FIG. 1 is an example of a print particle replenishment device 100. Examples of the print particle replenishment device 100 include containers and bottles. The print particle replenishment device 100 may contain and/or transfer print particles. For example, the print particle replenishment device 100 may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of an amount (e.g., contained amount) of print particles. Accordingly, it may be beneficial to replenish a container in a host device with print particles rather than replacing the host device.

In the example illustrated in FIG. 1, the print particle replenishment device 100 includes an output assembly 102. The output assembly 102 may be a portion of the print particle replenishment device 100 that is adapted to transfer print particles and/or deliver print particles to a host device from a storage portion of the print particle replenishment device 100 (e.g., the upper portion in FIG. 1). For example, the output assembly 102 may interface with a host device (e.g., a receptacle of a host device). Although the output assembly 102 is illustrated as having a smaller dimension (e.g., width, diameter, radius, etc.) than the remainder of the print particle replenishment device 100 (e.g., the storage portion) in FIG. 1, the output assembly 102 may have a smaller dimension, a same dimension, or a larger dimension than a remainder of the print particle replenishment device 100. In some examples, the output assembly 102 may be cylindrical in shape. In some examples, the output assembly 102 may have another shape (e.g., polygonal, irregular, prismatic, etc.). An "output neck" may be an example of the output assembly 102 that is narrower (e.g., smaller in a dimension, width, diameter, and/or radius) than the remainder of the print particle replenishment device 100 or a reservoir 105 of the print particle replenishment device 100. A "cylindrical output neck" may be an example of the output assembly 102 that is cylindrical in shape and narrower (e.g., smaller in a dimension, width, diameter, and/or radius) than the remainder of the print particle replenishment device 100 or a storage portion of the print particle replenishment device 100. As used herein, the term "cylindrical" may mean approximate conformity to a cylinder shape. For example, a cylindrical output assembly may include one or more portions that conform to or approximate a cylinder shape. For instance, a cylindrical output assembly may include one or more outer curved sections and/or an approximately circular end or base, while another end may or may not be circular.

The output assembly 102 may include an interfacing portion 104. The interfacing portion 104 may be a portion of the output assembly that contacts (e.g., abuts against) a host device (e.g., host device receptacle) during initial engagement. In some examples, the interfacing portion 104 (or at least a part of the interfacing portion 104) may be perpendicular to a rotating axis 110 of the output assembly 102. The rotating axis 110 is an axis about which the output assembly 102 rotates during docking with a host device. The rotating axis 110 may be a central axis of the output assembly 102 and/or of the print particle replenishment device 100.

The output assembly 102 may include one or more contact pads 106. The contact pad(s) 106 may be electrical contacts (e.g., electrical structures, plates, etc.) for interfacing with (e.g., touching) counterpart contact(s) on the host device. For example, the contact pads 106 may be metallic contacts capable of communicating electrical or electronic signals. The contact pad(s) 106 may be disposed on an outer portion of the output assembly 102. It should be noted that although the contact pads 106 are illustrated as being disposed on a side (e.g., curved) portion of the output assembly 102, contact pad(s) may additionally or alternatively be disposed on the end portion (e.g., bottom portion, planar portion) of the output assembly 102. In an example, one or more contact pads 106 may be disposed on the side of the output assembly 102 and one or more other contact pads 106 may be disposed on an end (e.g., bottom) of the output assembly 102. In some examples, the contact pad(s) 106 may be disposed on a plane on (e.g., approximately tangential to) the side of the output assembly 102. The interfacing portion 104 may be perpendicular to the plane along which the contact pad(s) 106 extend in some examples. It should be noted that the contact pads 106 may be located at any displacement relative to the channel 108 (when in a closed position, for instance). For example, contact pad(s) 106 may be located on an opposite side (e.g., centered at 180 degrees) relative to the channel 108 angle (from the rotating axis 110, for example), on a same side (e.g., centered at 0 degrees) relative to the channel 108 angle, laterally from the channel 108 angle (e.g., centered at 90 degrees and/or −90 degrees relative to the channel 108 angle), and/or at other dispositions. In some examples, the contact pads 106 may be located near the channel 108. For example, the contact pads 106 may be located next to the channel 108 on the end of the output assembly 102. In some examples, the contact pads 106 may be located on a same structure (e.g., output assembly 102) as the channel 108 and/or may be located within range from the channel (e.g., within 2 centimeters (cm), 3 cm, 4 cm, 5 cm, etc.).

As described herein, a number of contact pads 106 may be implemented. The contact pad(s) 106 may be utilized to interface with a memory device and/or electronic circuitry (e.g., integrated circuit) for authentication and/or dispense detection. Examples of contact pads include a ground contact, a power supply contact, a signal contact, a clock contact, and chip select contact. In some examples, multiple signal contacts may be utilized (e.g., a signal contact for one or more authentication signals and a signal contact for one or more dispense detection signals) or a single signal contact may be utilized (e.g., a signal contact for authentication signal(s) and/or dispense detection signal(s)).

In some examples, there may be two contact pads 106: a ground contact and a signal contact. Two contact pads may be implemented for an example of a "single-wire" interface. In some examples, there may be three contact pads 106: a power supply (e.g., Vcc) contact, a ground contact, and a signal contact. Three contact pads may be implemented for another example of a "single-wire" interface. In some examples, there may be four contact pads 106: a power supply (e.g., Vcc) contact, a ground contact, a clock contact, and a signal contact. Four contact pads may be implemented for a four-wire interface. In some examples, there may be five contact pads 106: a power supply (e.g., Vcc) contact, a ground contact, a clock contact, a chip select contact, and a signal contact. Five contact pads may be implemented for a five-wire interface. One or more additional wires and/or contact pads may be added to the foregoing examples.

In some examples, one or more of the contact pads 106 may be utilized for authentication and/or dispense detection. For example, authentication and/or dispense detection signals may be sent via a signal contact pad. In other examples, separate contacts may be utilized for authentication and dispense detection. For example, three contact pads may be implemented: a ground contact, an authentication signal contact, and a dispense detection signal contact.

In some examples, a print particle replenishment device circuit (e.g., memory device and/or integrated circuit) may connect to contacts for a cartridge via the contact pad(s) 106. The cartridge may have a different circuit (e.g., memory device and/or integrated circuit for authentication). The cartridge may have another set of contact pad(s) to route wires from the print particle replenishment circuit and/or the cartridge circuit (e.g., cartridge authentication circuit) to a printer circuit (e.g., a printed circuit assembly (PCA), formatter board, etc.).

In some examples, the print particle replenishment device circuit (e.g., print particle replenishment device authentication integrated circuit) and the cartridge circuit (e.g., cartridge authentication circuit) may share wires and/or contacts. For example, a print particle replenishment device authentication integrated circuit may be connected (with two wires on the print particle replenishment device, for example) to two contact pads 106. The two contact pads 106 may be connected to the cartridge authentication circuit (when docked, for example), which may be connected to two contact pads on the cartridge. The cartridge contact pads may be connected to contacts for a PCA on a printer. The cartridge contacts may be examples of the contact interfaces 328, 628 described in connection with FIG. 3 and FIG. 6.

In some examples, a contact interface may include a dispense detection signal contact, a dispense detection ground contact, an authentication signal contact (for replenishment device authentication and/or cartridge authentication, for example), and an authentication ground contact. The dispense signal contact may carry a dispense indication signal and/or dispense indication data. The authentication signal contact may carry an authentication signal. In some examples, the contact interface may include a dispense detection signal contact, a dispense detection ground contact, a replenishment device authentication signal contact, a replenishment device authentication ground contact, a cartridge authentication signal contact, and a cartridge authentication ground contact.

The contact pad(s) 106 may be adapted to rotate with the output assembly 102 or a portion (e.g., side portion) of the output assembly 102. For example, when the output assembly 102 or a portion of the cylindrical output assembly rotates, the contact pad(s) 106 may rotate with the output assembly 102. In some examples, the contact pad(s) 106 may maintain connection and/or contact with corresponding or counterpart contact(s) on the host device during rotation of the output assembly 102. For example, contact between the print particle replenishment device 100 and the host device may be made via a location on a locking ring of a host device receptacle to maintain constant contact through the entire refill process. Contacts or contact pads that rotate may be referred to as "orbiting contacts."

In some examples, one or more of the contact pads 106 may not maintain contact during rotation. For instance, the contact pad(s) 106 may provide or have intermittent connection and/or contact with corresponding or counterpart contact(s) on the host device. For example, an intermittent contact may have an intermittent connection when the output assembly 102 (e.g., contact pad(s) 106) is in one or more certain orientations. In some examples, the contact pad(s) 106 may have contact before rotation and/or after rotation, but not during rotation.

In some examples, the contact pad(s) 106 may be disposed on a protruding structure of the outer portion of the output assembly 102. For example, a planar structure may protrude from the curved (e.g., side) portion of the output assembly 102. The planar structure may be tangent to the curved portion (e.g., side) of the output assembly 102. In some examples, the protruding structure may engage a rotating counterpart of the host device.

In some examples, the contact pad(s) 106 may be adapted to rotate with the output assembly 102 when opening a channel 108 of the print particle replenishment device 100. For example, the output assembly 102 may be adapted to open the channel 108 when rotated relative to a host device or host device receptacle. The channel 108 may be an opening through which print particles may be transferred or delivered. It should be noted that the print particles may or may not contact the channel 108 during transfer. In the example of FIG. 1, the channel 108 is illustrated as a circular hole. It should be noted that in other examples, the channel 108 may have different shapes and/or locations. For example, the channel 108 may be a notch, ellipse, kidney, crescent, circle, irregular, semi-circle in shape, or another shape. The channel 108 may be offset from the rotating axis 110 or may be located on the rotating axis 110.

In some examples, the interfacing portion 104 may include a static portion. The static portion may be a portion of the output assembly 102 that remains static while another portion of the output assembly 102 rotates. For example, the static portion may include all or a part of the end of the output assembly 102. A rotating portion of the output assembly 102 may be a side part of the cylindrical output assembly. The static portion may remain stationary while the rotating portion may rotate about the rotating axis 110. In some examples, the static portion may be a disk that fits within cylindrical walls of the output assembly 102. In some examples, the static portion may include a cover and the channel 108 (e.g., a hole). For example, the cover may be a part of the static portion that covers an internal nozzle or port when the output assembly 102 is not rotated and/or when the internal nozzle or port is not aligned with the channel 108. The static portion may engage a receiving structure of the host device. For example, the channel 108 (e.g., hole, notch, etc.) may fit onto an interfering structure of the host device. In some examples, a tube or port on the host device may fit within the channel 108. Accordingly, the channel 108 may serve as a keying feature and as a communication (e.g., transfer, delivery) feature in some examples. The contact pad(s) 106 may rotate relative to the static portion. In some examples, the contact pad(s) 106 may rotate into contact with one or more counterpart contacts of the host device.

The contact pad(s) 106 may be coupled to a memory device and/or electronic circuitry. For example, the print particle replenishment device 100 (e.g., output assembly 102) may include a memory device and/or electronic circuitry. The contact pad(s) 106 may carry and/or receive one or more signals. For example, the contact pad(s) 106 may carry and/or receive one or more authentication signals and/or one or more dispense signals (e.g., dispense detection signals). In some examples, the memory device may store one or more authentication codes and/or algorithms. The print particle replenishment device 100 may send an authentication code via one or more contact pads 106 and/or may send one or more authentication algorithm signals via one or more contact pads 106. In some examples, the print particle replenishment device 100 may detect when the print particles have been dispensed (e.g., partially dispensed, completely dispensed, etc.). For example, when a syringe plunger has been inserted to a degree (e.g., 90%, 95%, completely, etc.) into the print particle replenishment device 100, a switch or contact within the print particle replenishment device 100 may close, which may cause a dispense signal to be sent via one or more contact pads 106. In some examples, the closure of the switch or contact may change a value in the memory device, which may be indicated via one or more contact pads 106 with a dispense signal.

In some examples, the print particle replenishment device 100 may include a reservoir 105 for storing print particles (e.g., print powder, toner, etc.). In some examples, the output assembly 102 may represent a narrower section of the print particle replenishment device 100 than the reservoir 105. In some examples, the print particles may flow through an opening (e.g., channel 108) generally along an output direction 107 of the print particles (e.g., print particle output direction). In some examples, the contact pad(s) 106 may be disposed at a side wall of the output assembly 102. For example, the contact pad(s) 106 may be disposed along a line that is a cross section of a plane that is perpendicular to the output direction 107 and a plane that is parallel to the output direction 107.

In some examples, one or more of the features (e.g., structures, portions, planes, disks, covers, etc.) described herein may relate to the output direction 107 (e.g., may be perpendicular to the output direction 107, may be parallel to the output direction 107, may rotate with respect to the output direction 107, etc.) instead of or in addition to a central axis or rotating axis. In some examples, the output direction 107 may be a general direction of print particle flow. In some examples, the general direction of print particle flow may be generally in the direction of gravity when the output assembly 102 is in a docked position. For example, the output assembly 102 may be oriented vertically with respect to gravity when docked. In other examples, the output assembly 102 may be oriented in different orientations.

Figures 2A, 2B:
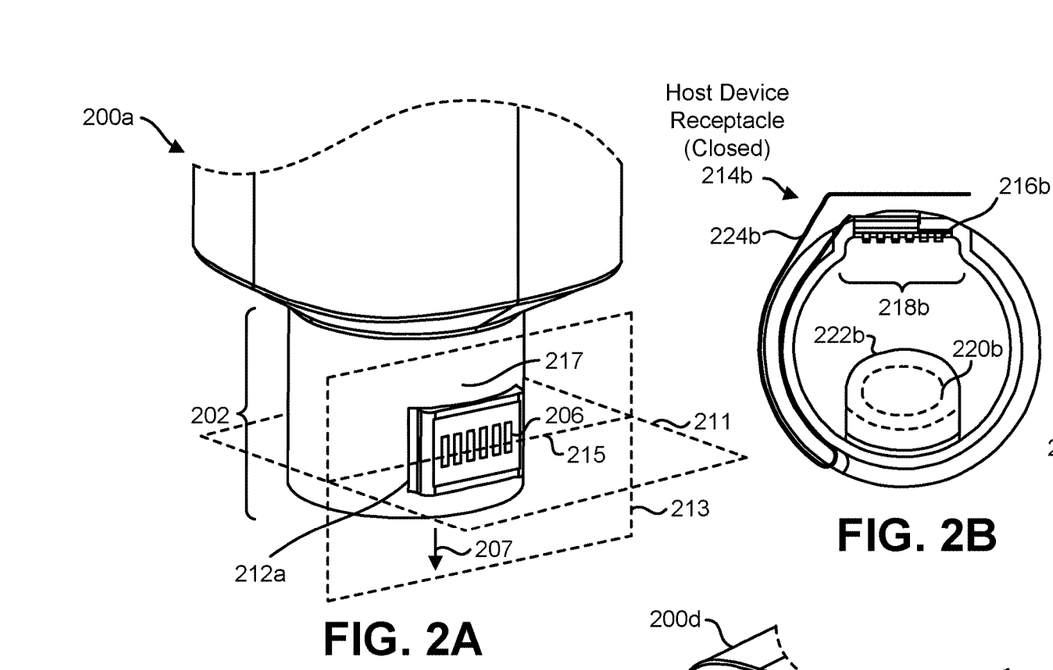
FIG. 2A is a perspective view of an example of a print particle replenishment device.
FIG. 2B is a top elevational view of an example of a host device receptacle.

FIG. 2A is a perspective view of an example of a print particle replenishment device 200a. In this example, the print particle replenishment device 200a includes an output assembly 202 that is a cylindrical output neck. In this example, the output assembly 202 includes a protruding structure 212a of the outer portion of the output assembly 202. Examples of contact pads 206 are also illustrated in FIG. 2A. Although six contact pads 206 are illustrated, the same or a different number of contact pads may be implemented. In some examples, the contact pads 206 may be disposed directly on the protruding structure 212a. In other examples, the protruding structure 212a may house a board (e.g., integrated circuitry, printed circuit board (PCB), logic board, etc.) on which the contact pads 206 may be disposed. For example, the contact pads 206 may be part of integrated circuitry. The integrated circuitry may extend in and/or on a support surface that is approximately tangential to the cylindrical output neck. For example, the protruding structure 212a may be an example of the support surface. Authentication and/or dispense indicating functions may be provided by the board.

In some examples, the protruding structure 212a may act as a locking and/or alignment feature, to lock onto a host device receptacle and/or to align with a host device receptacle. In some examples, the contact pad(s) 206 may be disposed at a side wall of the output assembly 202. For example, the contact pad(s) 206 may be disposed along a line 215 that is a cross section of a plane 211 that is perpendicular to the output direction 207 and a plane 213 that is parallel to the output direction 207. In some examples, the protruding structure 212a protrudes out of the output assembly 202 approximately in a direction perpendicular to an output direction 207 (e.g., a direction of flow of the print particles).

In some examples, the output assembly 202 includes an at least partially cylindrical side wall 217. The plurality of contact pads 206 may be disposed on a surface that is approximately tangential to, or that is adjacent and parallel to a surface approximately tangential to, the side wall 217.

The protruding structure 212a may interlock with a rotating counterpart structure (e.g., ring of a port cover) to maintain continuous contact (during engagement and rotation, for example) between the contact pads 206 and counterpart contacts of the host device. The protruding structure 212a may allow the print particle replenishment device to be more securely locked into the host device (e.g., host device receptacle). Maintaining continuous contact (for authentication and/or dispense detection) may allow for increased security. For example, maintaining continuous contact may help to prevent efforts to defeat (e.g., circumvent, break, etc.) authentication and/or dispense detection. In some examples, all authentication contact pad(s) and/or dispense indication contact pad(s) may be located on the protruding structure 212a.

In some examples, the contact pads 206 extend along a line 215 that is the intersection of a plane 211 perpendicular to a direction 207 of flow of the print particles and a plane 213 parallel to the direction 207 of flow of the print particles. For example, the contact pads 206 may extend along the line 215 such that the contact pads 206 sequentially move in a row in a rotation direction at docking. For example, as the contact pads 206 rotate towards a docked position, the contact pads 206 may move in sequence, with a leading contact pad passing a location (e.g., point of rotation) first, and the other contact pads passing the location (e.g., point of rotation) in sequence.

FIG. 2B is a top elevational view of an example of a host device receptacle 214b. In FIG. 2B, the host device receptacle 214b is in a closed position. In this example, the host device receptacle 214b includes contacts 216b. It should be noted that although six contacts 216b are illustrated, the same or a different number of contacts may be implemented. The contacts 216b may be corresponding or counterpart contacts 216b to the contact pads 206 of the print particle replenishment device 200a. In this example, the host device receptacle 214b includes a rotating portion that includes the contacts 216b. For example, the host device receptacle 214b includes a recess 218b to receive the protruding structure 212a of the print particle replenishment device 200a. When inserted into the host device receptacle 214b, the protruding structure 212a may engage a rotating counterpart of the host device. For example, the protruding structure 212a may engage the recess 218b to rotate a portion of the host device receptacle 214b.

In this example, the host device receptacle 214b includes a port cover 222b and a port 220b. When in the closed position, the port cover 222b covers the port 220b. A service loop 224b is coupled to the contacts 216b in the example illustrated in FIG. 2B. The service loop 224b may be a flexible conductor. For example, the service loop 224b may enable the contacts 216b to rotate with the rotating portion of the host device receptacle 214b and the print particle replenishment device 200a, which may allow continuous contact between one or more of (e.g., all of) the contact pads 206 and one or more of (e.g., all of) the contacts 216b. In some examples, the service loop 224b may be a flexible circuit to accommodate a range of motion (e.g., 90 degree rotation, 180 degree rotation, etc.) of the print particle replenishment device 200a (e.g., output assembly 202) and/or the port cover 222b. In the example illustrated in FIG. 2B, the contact pads 206 of the print particle replenishment device 200a may maintain contact and/or connection with the host device contacts 216b during (e.g., throughout) rotation.

Figure 2C:
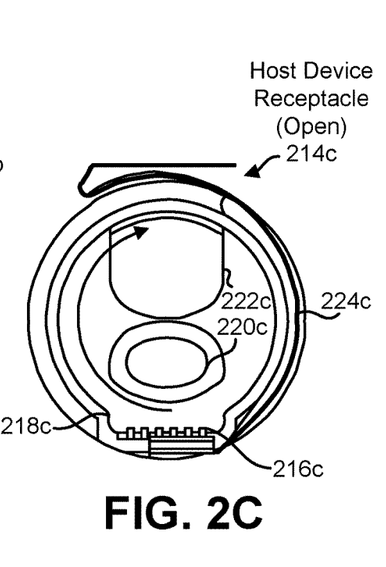
FIG. 2C is a top elevational view of an example of a host device receptacle in an open position.

FIG. 2C is a top elevational view of an example of a host device receptacle 214c in an open position. The host device receptacle 214c illustrated in FIG. 2C may be the host device receptacle 214b illustrated in FIG. 2B after the output assembly 202 has rotated while engaged with the host device receptacle 214b. In this example, the host device receptacle 214c is in an open position after a 180 degree rotation. As can be observed, the contacts 216c, recess 218c, and port cover 222c have rotated and the service loop 224c has extended to accommodate the rotation. When in the open position, the port 220c is uncovered.

Figure 2D:
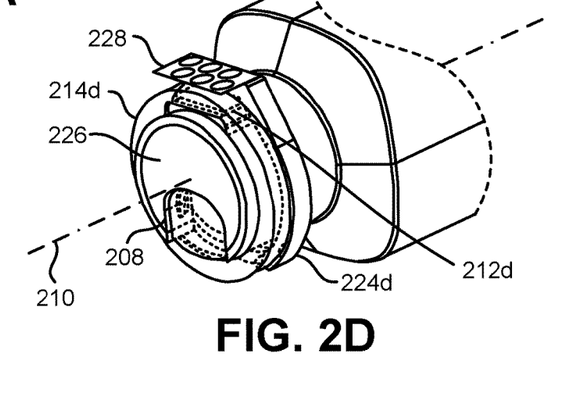
FIG. 2D is a perspective view of an example of a print particle replenishment device and a host device receptacle.

FIG. 2D is a perspective view of an example of a print particle replenishment device 200d and a host device receptacle 214d. In this example, the print particle replenishment device 200d is engaged with the host device receptacle 214b. While the host device receptacle 214d may be part of or attached to a host device (e.g., cartridge, printer, etc.), the perspective view of FIG. 2D illustrates a portion of the host device receptacle 214d. FIG. 2D also illustrates rotating axis 210, a service loop 224d, and a channel 208 of the print particle replenishment device 200d. One end of the service loop 224d may be coupled to a protruding structure 212d. Another end of the service loop 224d may be (or may be coupled to) a contact interface 228 in some examples. For example, the contact interface 228 may be in communication with a host device controller (e.g., logic board on a cartridge and/or printer). The host device controller may communicate (for authentication and/or dispense indication, for example) with a memory device and/or electronic circuitry in the print particle replenishment device via the contact interface 228, service loop 224d, host device contacts, and/or print particle replenishment device 200d contact pads. In the example illustrated in FIG. 2D, the channel 208 is a notch. In this example, a static portion 226 of the print particle replenishment device 200d is a disk that remains static relative to a host device port (e.g., port 220b) while the output assembly and protruding structure 212d rotate about the rotating axis 210.

Figure 3A:
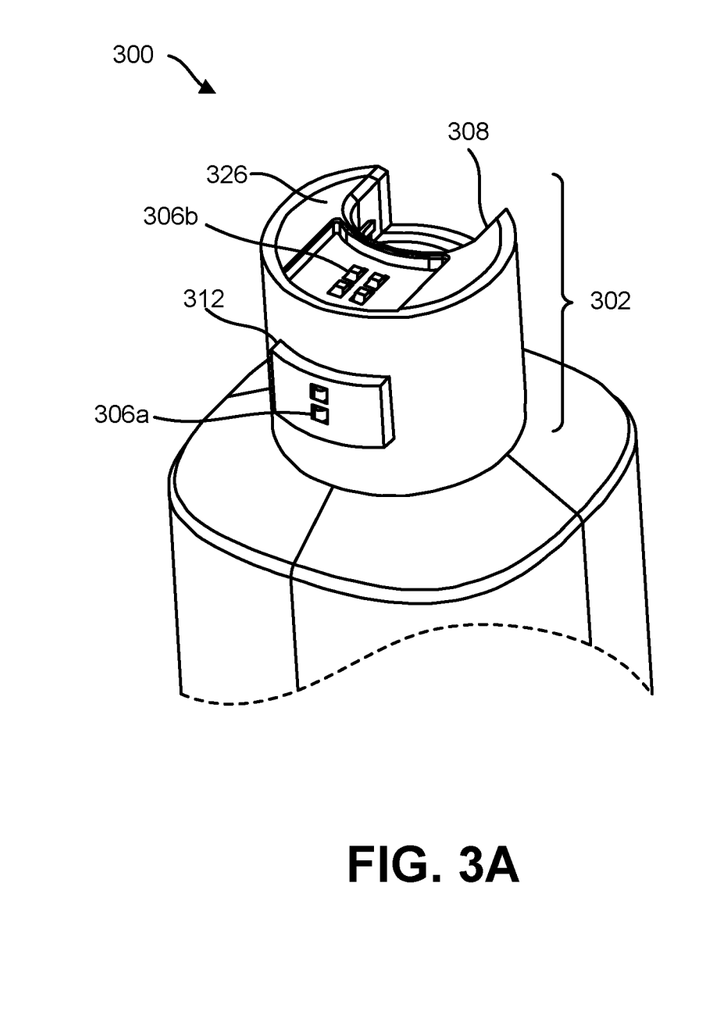
FIG. 3A is a perspective view of another example of a print particle replenishment device.

FIG. 3A is a perspective view of another example of a print particle replenishment device 300. In this example, the print particle replenishment device 300 has an output assembly 302 that includes a protruding structure 312 of the outer portion of the output assembly 302. An example of a first subset of contact pads 306a and an example of a second subset of contact pads 306b are illustrated in FIG. 3A. The first subset of contact pads 306a is disposed on a side of the output assembly 302 and a second subset of contact pads 306b is disposed on an end of the output assembly 302. For example, the second subset of contact pads 306b may be disposed on a static portion 326 of the print particle replenishment device 300.

In some examples, the first subset of contact pads 306a may include dispense indication contact pads and the second subset of contact pads 306b may include authentication contact pads. In the example of FIG. 3A, the channel 308 is offset from a rotating axis of the print particle replenishment device 300. In this example, the second subset of contact pads 306b is offset from the rotating axis of the print particle replenishment device. The second subset of contact pads 306b may remain in a static position (e.g., in situ) while a rotating portion of the output assembly 302 (with the first subset of contact pads 306a, for example) rotates about the rotating axis. Although six contact pads 306a-b are illustrated, the same or a different number of contact pads may be implemented. In some examples, one subset of contact pads may be utilized for dispense indication while another subset of contact pads may be utilized for authentication. For example, the first subset of contact pads 306a may carry and/or communicate a dispense indication signal and the second subset of contact pads 306b may carry and/or communicate an authentication signal.

In some examples, contact pads utilized for authentication may maintain a constant or continuous connection during engagement. For example, the second subset of contact pads 306b may maintain a constant connection during engagement (e.g., during refill) by connecting through the end of the output assembly 302. The second subset of contact pads 306b may remain static during movement of the rotating portions of the print particle replenishment device 300. In an example, the first subset of contact pads 306a may be located on the side of the output assembly, which may simplify the electronic design of the print particle replenishment device 300.

In the example illustrated in FIG. 3A, the channel 308 is a notch. In this example, a static portion 326 of the print replenishment device is a disk that remains static relative to a host device port while the output assembly 302 and protruding structure 312 rotate about the rotating axis.

In some examples, the first subset of contact pads 306a (e.g., dispense indication contact pads) makes a connection in the docked position (when dispensing occurs, for example). This may allow for easier access for dispense detection. The first subset of contacts pads 306a may be spring contacts that lead to structure and/or circuitry (e.g., switch, contacts) for detecting print particle dispensing. For example, when the print particle replenishment device 300 is initially engaged (e.g., inserted into a host device receptacle), the first subset of contact pads 306a (e.g., spring contacts) may not be in contact with corresponding contacts on the host device. The first subset of contact pads 306a may contact the corresponding contacts on the host device once rotated and docked.

Figure 3B:
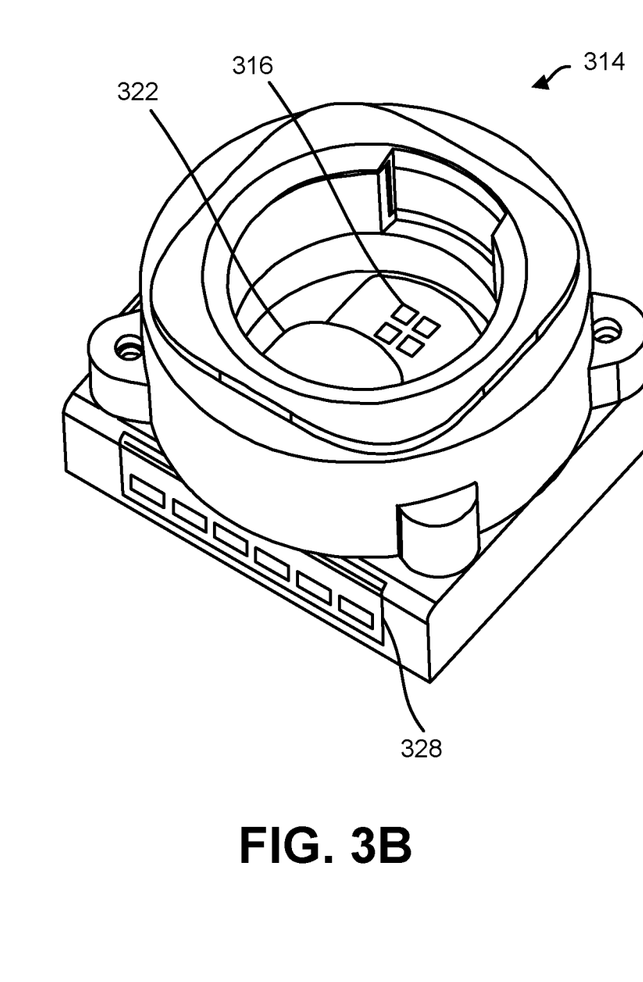
FIG. 3B is a perspective view of another example of a host device receptacle.

FIG. 3B is a perspective view of another example of a host device receptacle 314. In FIG. 3B, the host device receptacle 314 is in a closed position. In this example, the host device receptacle 314 includes a second subset of contacts 316 corresponding to the second subset of contact pads 306b. The second subset of contact pads 306b may maintain a connection and/or contact with the second subset of contacts 316 through rotation of the output assembly 302 in the host device receptacle 314.

A first subset of contacts corresponding to the first subset of contact pads 306a is not shown in FIG. 3B. For example, upon rotating the output assembly 302 within the host device receptacle 314 by 180 degrees, the first subset of contact pads 306a may come into contact with the first subset of contacts on the host device. This is one example of intermittent contact or connection.

In this example, the host device receptacle 314 includes a port cover 322. When in the closed position, the port cover 322 covers a port. The contacts (e.g., first subset of contacts and second subset of contacts 316) may be coupled to a contact interface 328 in some examples. For example, the contact interface 328 may be in communication with a host device controller (e.g., logic board on a cartridge and/or printer).

Figure 4A:
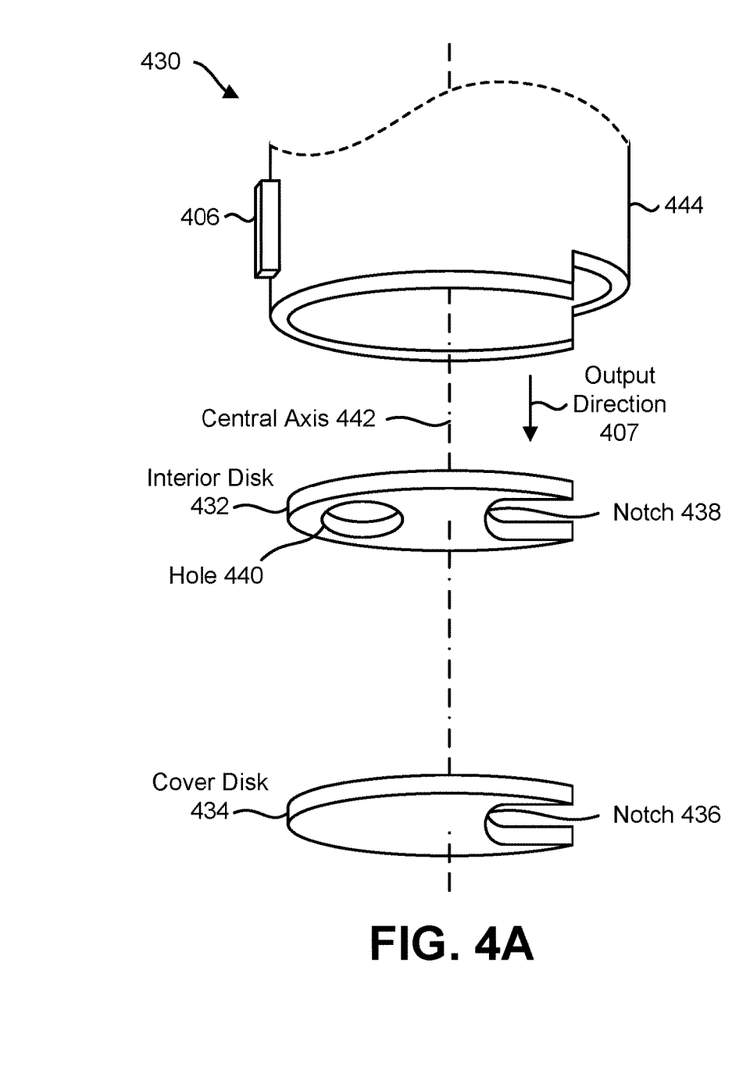
FIG. 4A is an exploded perspective view of an example of a cylindrical output neck.

FIG. 4A is an exploded perspective view of an example of a cylindrical output neck 430. The cylindrical output neck 430 may be an example of the output assembly 102 described in connection with FIG. 1. In some examples, the cylindrical output neck 430 may be part of a print particle donor container. A print particle donor container may be a container that holds print particles for donation (e.g., transfer or delivery) to a host device (e.g., print cartridge and/or printer).

The cylindrical output neck 430 may include a cover disk 434. The cover disk 434 may protrude from a housing 444, may be situated flush with the end of the housing 444, or may be situated at a distance within the housing 444. The cover disk 434 may be disposed perpendicular to the central axis 442 of the cylindrical output neck 430 and/or perpendicular to an output direction 407. The cover disk 434 may include a notch 436 offset from a central axis 442. The cover disk 434 may be adapted to maintain a static position during rotation of a print particle donor container about the central axis 442. In some examples, the notch 436 may engage a structure (e.g., port) of a host device. For example, the structure (e.g., port) may fit within the notch 436. The structure may hold the cover disk 434 in a static position during rotation of the cylindrical output neck 430.

The cylindrical output neck 430 may include an interior disk 432. The interior disk 432 may be situated within the housing 444. The interior disk 432 may be disposed perpendicular to the central axis 442 of the cylindrical output neck 430 and/or perpendicular to an output direction 407. The interior disk 432 may include a notch 438 offset from the central axis 442. The interior disk 432 may include a hole 440 offset from the central axis 442. In some examples, the hole 440 may be located at an angular displacement from or in an opposite direction from the notch 438. The interior disk 432 may be adapted to shear relative to the cover disk 434 during rotation of the print particle donor container. For example, as the cylindrical output neck 430 rotates, the interior disk 432 may rotate with the cylindrical output neck 430, while the cover disk remains static. In some examples, the notch 438 may engage a port cover of a host device. As the interior disk 432 rotates, the notch 438 may rotate the port cover. The rotation of the interior disk 432 may align the hole 440 with the notch 436 of the cover disk 434. In some examples, a structure (e.g., port) of the host device may be situated within the notch 436. Accordingly, the hole 440 may be rotated into alignment with the structure (e.g., port). In some examples, the structure (e.g., port) may abut the interior disk 432 during a least a portion of a rotation. Accordingly, the interior disk 432 may slide or shear relative to the structure (e.g., port).

The cylindrical output neck 430 may include one or more contact pads 406 (e.g., electrical contact pads) situated on an exterior of the cylindrical output neck 430. For example, the one or more contact pads 406 may be situated on the side of the cylindrical output neck 430, on an end of the cylindrical output neck 430 (e.g., on the cover disk 434), or both. One or more of the contact pad(s) 406 may be adapted to rotate with the cylindrical output neck 430. In some examples, one or more contact pads 406 on the end or bottom of the cylindrical output neck 430 (e.g., on the cover disk 434) may be adapted to maintain a static position during rotation of the print particle donor container. One or more of the contact pad(s) 406 may be electrically connected to a memory device of the print particle donor container. For example, the cylindrical output neck 430 may include a memory device disposed in the interior of the housing 444.

In some examples, the interior disk 432 and the contact pad(s) 406 may be adapted to rotate with the print particle donor container while the cover disk 434 maintains a static position relative to a host device receptacle. For example, the cylindrical output neck 430 may fit within a host device receptacle (e.g., a recess on a host device). The cover disk 434 may remain stationary while the interior disk 432 and the contact pad(s) 406 rotate in the host device receptacle.

In some examples, the contact pad(s) 406 may be situated on a planar structure of the exterior of the cylindrical output neck 430. For example, the contact pad(s) 406 may be disposed on a protruding structure of the cylindrical output neck 430. The planar structure may be parallel to the central axis 442.

In some examples, the print particle donor container may interface with a syringe plunger. For example, the syringe plunger may be pressed into the print particle donor container to donate (e.g., transfer, deliver) print particles when the cylindrical output neck 430 is in an open position. The memory device may update dispense status data when the plunger is inserted (e.g., inserted to a degree) into the print particle donor container. For example, contacts or a switch within the print particle donor container that are coupled to the memory device may close when the syringe plunger is fully inserted into the print particle donor container. The memory device may detect the closure and update the dispense status data to indicate that dispensing is complete (e.g., that the print particle donor container is nearly or completely empty).

Figure 4B:
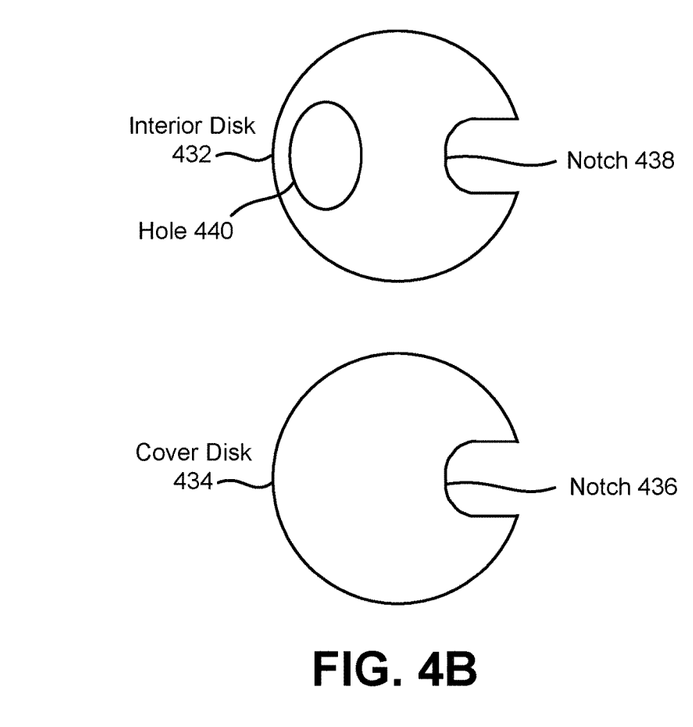
FIG. 4B is a top elevational view of an example of the interior disk and the cover disk.

FIG. 4B is a top elevational view of an example of the interior disk 432 and the cover disk 434. As described in connection with FIG. 4A, the interior disk 432 may include a notch 438 and a hole 440. The cover disk 434 may include a notch 436. The notch 436 may be an example of the channel 108 described in connection with FIG. 1.

In some examples, the interior disk 432 may include one or more components. For example, the interior disk 432 may include a first layer (e.g., rigid layer, hard plastic layer, etc.) and a second layer (e.g., wiping layer, absorbent layer, felt layer, cloth layer, rubber layer, etc.). The second layer may function to clean print particles.

In some examples, the cover disk 434 may include one or more components. For example, the cover disk 434 may include a first layer (e.g., rigid layer, hard plastic layer, etc.) and a second layer (e.g., wiping layer, absorbent layer, felt layer, cloth layer, rubber layer, etc.). The second layer may function to clean print particles. In some examples, the second layer of the interior disk 432 and the second layer of the cover disk 434 may be situated adjacent one another.

Figure 5:
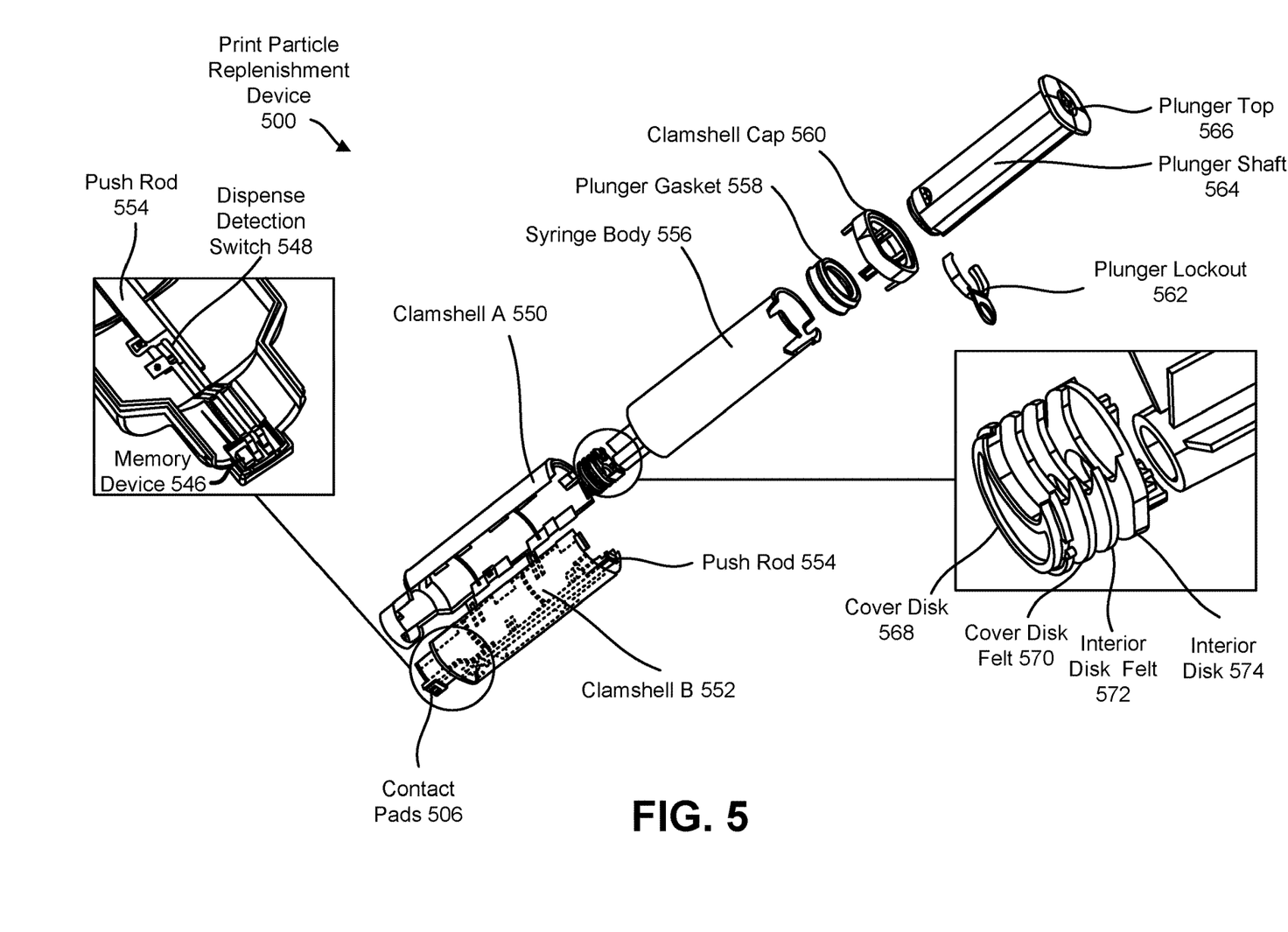
FIG. 5 is an exploded perspective diagram illustrating another example of a print particle replenishment device.

FIG. 5 is an exploded perspective diagram illustrating another example of a print particle replenishment device 500. The print particle replenishment device 500 illustrated in FIG. 5 may be an example of the print particle replenishment device 100 described in connection with FIG. 1. FIG. 5 provides a zoomed in view of a portion of clamshell B 552 from an interior perspective. FIG. 5 also provides a zoomed in view of a valve stack (cover disk 568 and interior disk 574) from a different perspective.

In this example, the print particle replenishment device 500 includes clamshell A 550 (e.g., a clamshell with a tip), clamshell B 552, a syringe body 556, a plunger gasket 558, a clamshell cap 560, a plunger lockout 562 (e.g., packaging to be removed for replenishment, for example), and a plunger (including a plunger shaft 564 and a plunger top 566). In this example, the memory device 546 is included in clamshell B 552. In some examples, the memory device 546 may be implemented in Electrically Erasable Programmable Read-Only Memory (EEPROM). For example, the memory device 546 may be implemented as an EEPROM integrated circuit (e.g., chip or board). Other kinds of memory may be implemented in other examples. The memory device 546 may be coupled to contact pads 506. As described herein, the memory device 546 may store authentication data and/or dispense data. In some examples, the contact pads 506 may be implemented as a circuit board (e.g., printed circuit board (PCB)). In some examples, the circuit board may be insert molded into clamshell B 552. In some examples, an interior side of the circuit board may include the memory device 546 and/or one or more contact pads for a dispense detection mechanism.

In some examples, a dispense detection switch 548 and/or a push rod 554 may be implemented to detect when print particles are dispensed from the print particle replenishment device 500. For example, as the plunger is inserted and/or pressed into the print particle replenishment device 500 (e.g., into the syringe body 556), the plunger may actuate the push rod 554, which may close the dispense detection switch 548. The dispense detection switch 548 (e.g., two switch parts or leads) may be coupled to the contact pads 506 and/or memory device 546. For example, the interior of the circuit board may include contact pads for dispense detection leads. The dispense detection leads may engage the circuit board during assembly. In some examples, when the dispense detection switch 548 is closed, the memory device 546 may update the dispense detection data to indicate that the print particles have been dispensed. The memory device 546 may send a dispense indicator signal that indicates the dispense detection data via the contact pads 506. In some examples, the dispense detection may be performed independently of the memory device 546 and/or dispense detection data. For example, a host device may determine whether the dispense detection switch 548 is closed or open (e.g., whether a current flows through the dispense detection switch or not, whether a voltage indicates closure of the dispense detection switch). The switch state may accordingly provide the dispense indicator signal. Examples of the dispense indicator signal may include an indicator of dispense indicator data (from a memory device) and/or a current or voltage resulting from the state of a dispense detection mechanism (e.g., switch, contacts, etc.). A host device may receive the dispense indicator signal.

In some examples, the host device may utilize the dispense indicator signal to perform one or more functions. For example, if the print particle replenishment device 500 is engaged but not docked, the host device may unlock the host device receptacle to allow docking and delivery of print particles if the dispense indicator signal indicates that the print particles have not been dispensed. In another example, if the print particle replenishment device 500 is engaged but not docked and the dispense indicator signal indicates that the print particles have been dispensed, the host device may not unlock the host device receptacle for docking.

In some examples, the memory device 546 may send an authentication signal (e.g., indicating the authentication data) via the contact pads 506. A host device may receive the authentication signal. The host device may unlock the host device receptacle for docking and delivery of print particles if the authentication signal (e.g., authentication data) passes a check. Otherwise, the host device may not unlock the host device receptacle.

In some examples, the host device may utilize a combination of the dispense indicator signal and the authentication signal to determine whether to unlock the host device receptacle. For example, at engagement, the host device may unlock the host device receptacle if the dispense indicator signal indicates that the print particles have not been dispensed and if the authentication signal passes a check. Otherwise, the host device may not unlock the host device receptacle to avoid unauthorized replenishment.

In the example illustrated in FIG. 5, the print particle replenishment device 500 includes a cover disk 568, cover disk felt 570, interior disk felt 572, and an interior disk 574. The cover disk 568 and cover disk felt 570 may be an example of the cover disk 434 described in connection with FIGS. 4A and 4B. The interior disk felt 572 and the interior disk 574 may be an example of the interior disk 432 described in connection with FIGS. 4A and 4B.

Figure 6A:
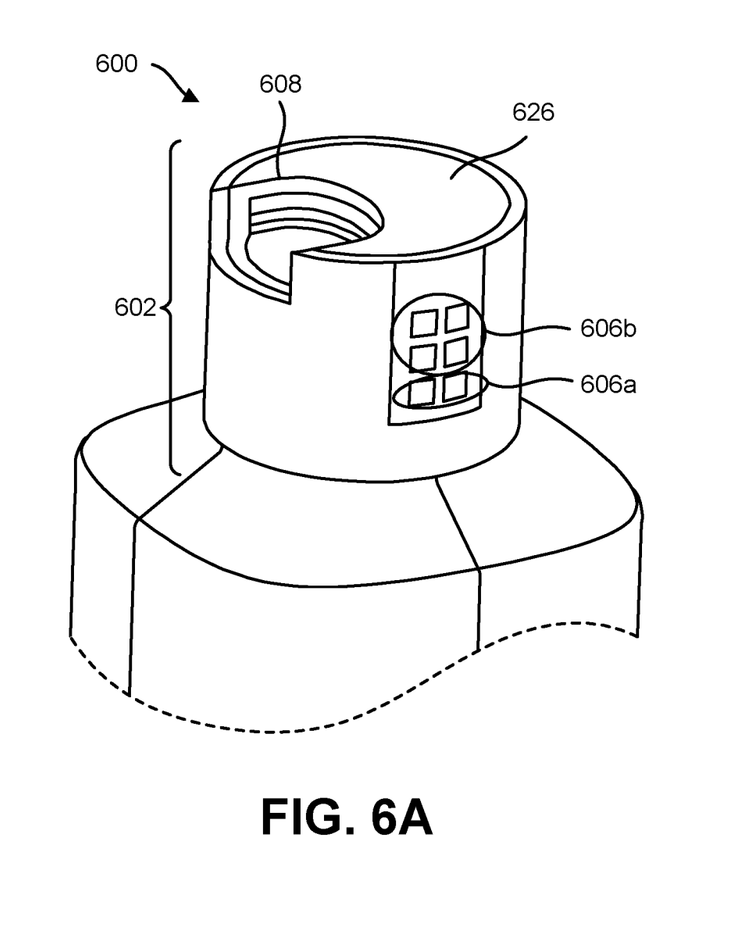
FIG. 6A is a perspective view of another example of a print particle replenishment device.

FIG. 6A is a perspective view of another example of a print particle replenishment device 600. In this example, the print particle replenishment device 600 has an output assembly 602 that includes a set of contact pads 606a-b. An example of a first subset of contact pads 606a and an example of a second subset of contact pads 606b are illustrated in FIG. 6A. The first subset of contact pads 606a and the second subset of contact pads 606b are disposed on a side of the output assembly 602. In some examples, the first subset of contact pads 606a may include dispense indication contact pads and the second subset of contact pads 606b may include authentication contact pads. The set of contact pads 606a-b may rotate about the rotating axis. Although six contact pads 606a-b are illustrated, the same or a different number of contact pads may be implemented. In some examples, one subset of contact pads may be utilized for dispense indication while another subset of contact pads may be utilized for authentication. For example, the first subset of contact pads 606a may carry and/or communicate a dispense indication signal and the second subset of contact pads 606b may carry and/or communicate an authentication signal.

In the example illustrated in FIG. 6A, the first subset of contact pads 606a and the second subset of contact pads 606b may be intermittent contacts. For example, the second subset of contact pads 606b may contact counterpart or corresponding contacts upon engagement with a host device (e.g., upon insertion of the output assembly 602 into a host device receptacle). This may enable a host device to authenticate the print particle replenishment device 600 and unlock the host device receptacle. Upon rotation, the second subset of contact pads 606b may disconnect from the counterpart or corresponding contacts of a host device. For example, four authentication contact pads 606b may touch off on the corresponding port contacts. This may allow the initial authentication to unlock the port, and may not maintain connection throughout replenishment, for example.

In an example, the first subset of contact pads 606a may not contact counterpart or corresponding contacts upon engagement with a host device (e.g., upon insertion of the output assembly 602 into a host device receptacle). Upon rotation, the first subset of contact pads 606a may connect with counterpart or corresponding contacts of a host device. For example, two dispense detect contact pads 606a may touch off on the corresponding host device contacts once in the docked position. This may allow a dispense detection mechanism (e.g., switch, contacts, and/or memory device) to communicate with the host device.

In the example illustrated in FIG. 6A, the channel 608 is a notch. In this example, a static portion 626 of the print replenishment device is a disk that remains static relative to a host device port while the output assembly 602 and contact pads 606a-b rotate about the rotating axis. In the example of FIG. 6A, the contact pads 606a-b are located laterally from the channel 608 angle (e.g., at an angular difference of 90 degrees).

Figure 6B:
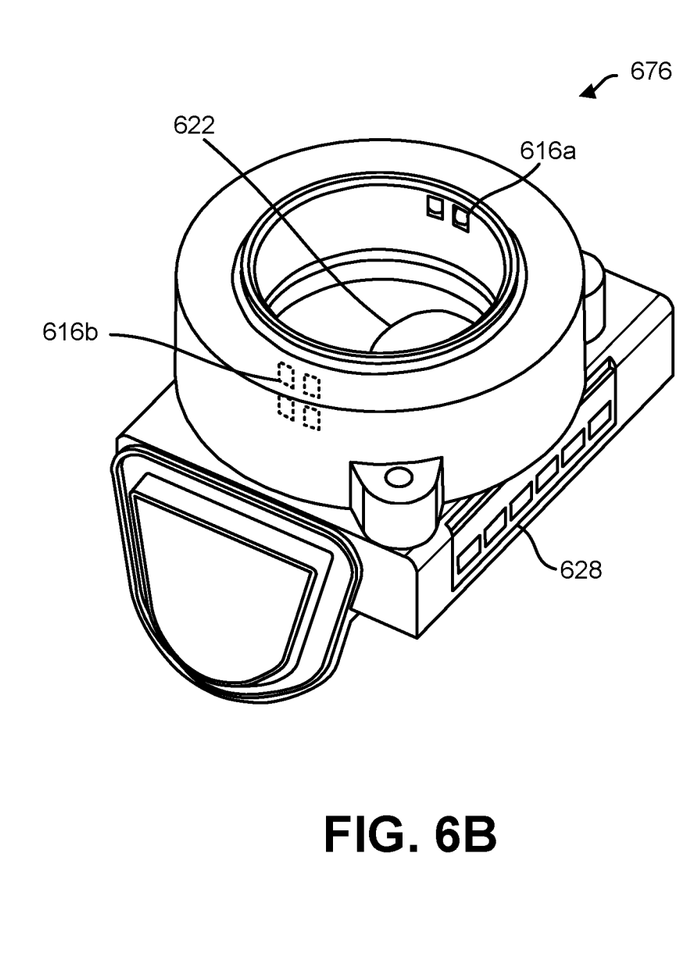
FIG. 6B is a perspective view of another example of a host device receptacle.

FIG. 6B is a perspective view of another example of a host device receptacle 676. In FIG. 6B, the host device receptacle 676 is in a closed position. In this example, the host device receptacle 676 includes a second subset of contacts 616b corresponding to the second subset of contact pads 606b. The second subset of contact pads 606b may establish a connection and/or contact with the second subset of contacts 616b upon engagement and before rotation of the output assembly 602 in the host device receptacle 676.

A first subset of contacts 616a corresponding to the first subset of contact pads 606a is also shown in FIG. 6B. For example, upon rotating the output assembly 602 within the host device receptacle 676 by 180 degrees, the first subset of contact pads 606a may come into contact with the first subset of contacts 616a on the host device. This is one example of intermittent contact or connection.

In this example, the host device receptacle 676 includes a port cover 622. When in the closed position, the port cover 622 covers a port. The contacts (e.g., first subset of contacts 616a and second subset of contacts 616b) may be coupled to a contact interface 628 in some examples. For example, the contact interface 628 may be in communication with a host device controller (e.g., logic board on a cartridge and/or printer).

Figure 7:
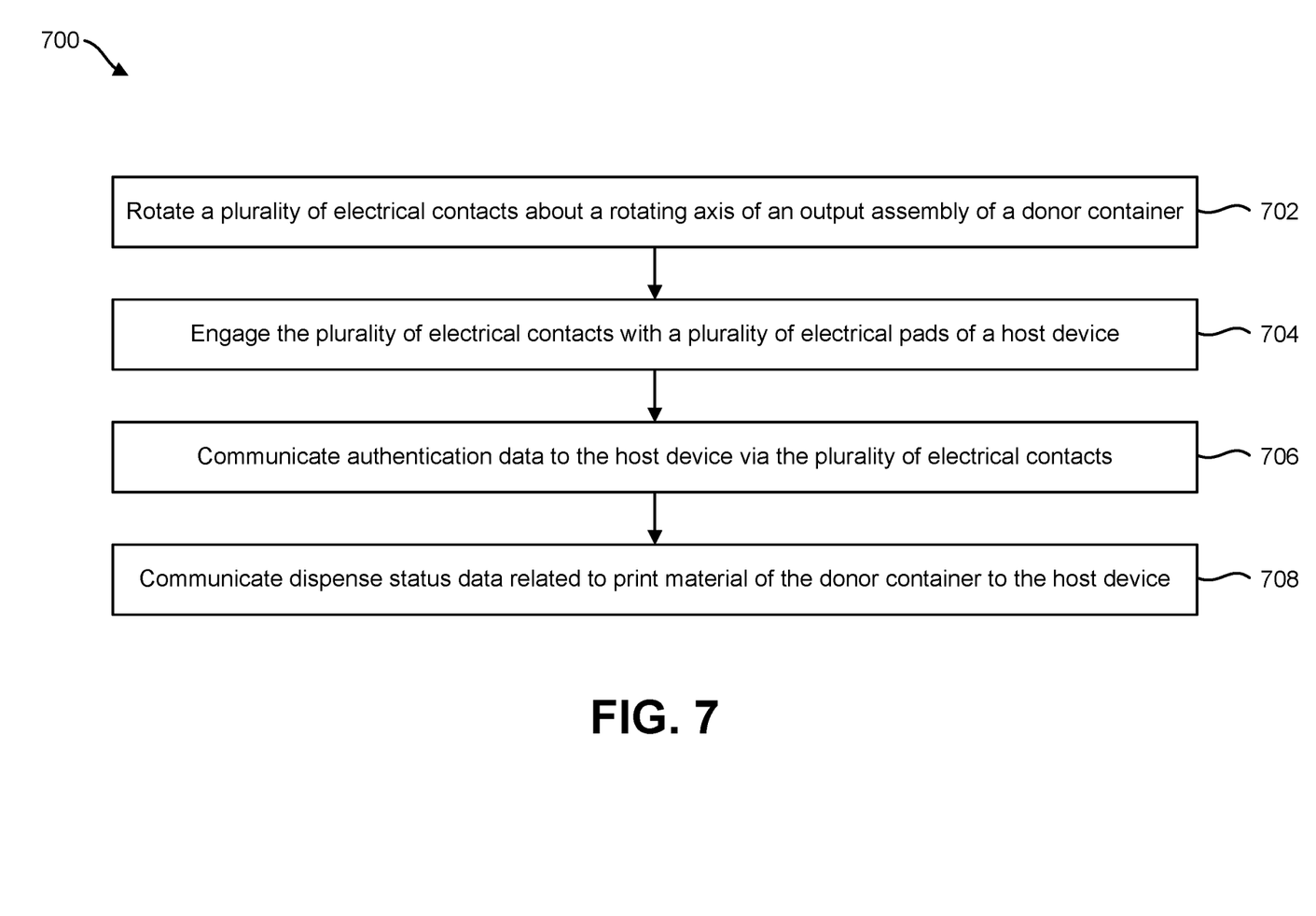
FIG. 7 is a flow diagram illustrating an example of a method for delivering print particles.

FIG. 7 is a flow diagram illustrating an example of a method 700 for delivering print particles. The method 700 may be performed by and/or with one or more of the print particle replenishment devices 100, 200a, 200d, 300, 500, 600 and/or cylindrical output necks 430 described herein.

A plurality of electrical contacts may be rotated 702 about a rotating axis of an output assembly of a donor container. For example, the contact pads 106 may be rotated around a rotating axis 110 of an output assembly 102. The rotation may be manually performed by a user or may be performed automatically (e.g., a host device may include a mechanism, such as gearing, to rotate an output assembly).

The plurality of electrical contacts may be engaged 704 with a plurality of electrical pads of a host device. For example, the contact pads 106 may contact or connect with counterpart or corresponding electrical contacts of a host device. The engagement may occur when the donor container is inserted into a host device receptacle, during the rotation 702, and/or at the end of the rotation 702.

Authentication data may be communicated 706 to the host device via the plurality of electrical contacts. For example, a memory device may send an authentication signal indicating the authentication data via one or more contact pads 106. In some examples, a host device may send a request for the authentication signal and/or may read the authentication data via the electrical contacts.

Dispense status data related to print material of the donor container may be communicated 708 to the host device via the plurality of electrical contacts. For example, a memory device may send a dispense signal indicating the dispense status data via one or more contact pads 106. In some examples, a host device may send a request for the dispense signal and/or may read the dispense status data via the electrical contacts. In some examples, the authentication data may be communicated in response to an undocked connection (e.g., before rotation) between the donor container and the host device, and the dispense status data is communicated in response to a docked connection (e.g., after rotation) between the donor container and the host device.

In some examples, the method 700 may include updating the dispense status data based on an insertion of a plunger into the donor container. For example, when a dispense detection switch is actuated due to plunger insertion, the memory device may update the dispense status data to indicate that print particle dispensing is complete.

The invention claimed is:

1. A print particle replenishment device for replenishing a host device, comprising:
   an output assembly to output print particles, the output assembly comprising an interfacing portion comprising:
      a cover disk perpendicular to a central axis of the output assembly, wherein the cover disk comprises a first notch offset from the central axis, the cover disk to maintain a static position when the print particle replenishment device is rotated about the central axis; and
      an interior disk perpendicular to the central axis, wherein the interior disk comprises a second notch offset from the central axis and a hole offset from the central axis to dispense print particles, the interior disk to shear relative to the cover disk when the print particle replenishment device is rotated about the central axis; and
   a plurality of contact pads disposed on an outer portion of the output assembly to rotate with the output assembly when opening a channel of the print particle replenishment device.

2. The print particle replenishment device of claim 1, further comprising a reservoir to store the print particles, and wherein:
   the output assembly represents a narrower section than the reservoir,
   the print particles flow through an output opening along an output direction of the print particles, and
   the contact pads are disposed at a side wall of the output assembly, along a line that is a cross section of a first plane that is perpendicular to the output direction and a second plane that is parallel to the output direction.

3. The print particle replenishment device of claim 2, wherein the output assembly comprises a cylindrical output neck, wherein the contact pads are part of integrated circuitry, the integrated circuitry extending in or on a support surface that is approximately tangential to the cylindrical output neck.

4. The print particle replenishment device of claim 1, wherein the interfacing portion is perpendicular to a rotating axis of the output assembly, and perpendicular to a plane along which the contact pads extend.

5. The print particle replenishment device of claim 1, wherein the interfacing portion comprises a static portion comprising the cover disk and the first notch to engage a receiving structure of the host device, wherein the plurality of contact pads is to rotate relative to the static portion into contact with a plurality of counterpart contacts of the host device.

6. The print particle replenishment device of claim 5, wherein the cover disk comprises a cover and the first notch comprises a hole.

7. The print particle replenishment device of claim 1, wherein the plurality of contact pads extend along a line that is an intersection of a plane perpendicular to a direction of flow of the print particles and a plane parallel to the direction of flow of the print particles, wherein the plurality of contact pads sequentially move in a row in a rotation direction at docking.

8. The print particle replenishment device of claim 1, wherein the plurality of contact pads is disposed on a protruding structure of the outer portion of the output assembly.

9. The print particle replenishment device of claim 8, wherein the protruding structure protrudes out of the output assembly approximately in a direction perpendicular to a direction of flow of the print particles.

10. The print particle replenishment device of claim 8, wherein the protruding structure is to engage a rotating counterpart of the host device.

11. The print particle replenishment device of claim 1, wherein the plurality of contact pads is disposed on a side of the output assembly.

12. The print particle replenishment device of claim 1, wherein the output assembly comprises an at least partially cylindrical side wall, and wherein the plurality of contact pads is disposed on a surface that is approximately tangential to, or that is adjacent and parallel to a surface approximately tangential to, the side wall.

13. The print particle replenishment device of claim 1, wherein a first subset of the plurality of contact pads is disposed on a side of the output assembly and a second subset of the plurality of contact pads is disposed on an end of the output assembly.

14. The print particle replenishment device of claim 1, wherein the plurality of contact pads is to maintain connection with a corresponding plurality of host device contacts during rotation of the output assembly.

15. The print particle replenishment device of claim 1, wherein the plurality of contact pads is to provide an intermittent connection with a corresponding plurality of host device contacts.

16. The print particle replenishment device of claim 1, wherein the output assembly is cylindrical in shape.

17. A print particle donor container comprising:
   a memory device; and
   a cylindrical output neck comprising:
      a cover disk perpendicular to a central axis of the cylindrical output neck, wherein the cover disk comprises a first notch offset from the central axis, the cover disk to maintain a static position when the print particle donor container is rotated about the central axis;
      an interior disk perpendicular to the central axis, wherein the interior disk comprises a second notch offset from the central axis and a hole offset from the central axis to dispense print particles, the interior disk to shear relative to the cover disk when the print particle donor container is rotated about the central axis; and a plurality of electrical contact pads situated on an exterior of the cylindrical output neck to rotate with the cylindrical output neck, wherein the plurality of electrical contact pads is electrically connected to the memory device.

18. The print particle donor container of claim 17, wherein the interior disk and the plurality of electrical contact pads are to rotate with the print particle donor container while the cover disk maintains the static position relative to a host device receptacle.

19. The print particle donor container of claim 17, wherein the plurality of electrical contact pads is situated on a planar structure of the exterior of the cylindrical output neck, wherein the planar structure is parallel to the central axis.

20. The print particle donor container of claim 17, wherein the print particle donor container interfaces with a syringe plunger, and wherein the memory device is to update dispense status data when the syringe plunger is inserted into the print particle donor container.

21. The print particle donor container of claim 17, wherein a second plurality of electrical contact pads is situated on a bottom of the cylindrical output neck to maintain a static position during rotation of the print particle donor container.

22. A method, comprising:

rotating a plurality of electrical contacts about a rotating axis of an output assembly of a donor container while maintaining a cover disk perpendicular to a central axis of the output assembly in a static position and shearing relative to the cover disk an interior disk perpendicular to the central axis to dispense print particles;

engaging the plurality of electrical contacts with a plurality of electrical pads of a host device;

communicating authentication data to the host device via the plurality of electrical contacts; and communicating dispense status data related to print material of the donor container to the host device.

23. The method of claim 22, further comprising updating, by a memory device of the donor container, the dispense status data based on an insertion of a plunger into the donor container.

24. The method of claim 22, wherein the authentication data is communicated in response to an undocked connection between the donor container and the host device, and wherein the dispense status data is communicated in response to a docked connection between the donor container and the host device.

25. The method of claim 22, wherein the plurality of electrical contacts comprises a dispense detection signal contact, a dispense detection ground contact, an authentication signal contact, and an authentication ground contact.

* * * * *